US012731601B2

(12) United States Patent
Sakurai et al.

(10) Patent No.: US 12,731,601 B2
(45) Date of Patent: Sep. 8, 2026

(54) ARTICULATION DISORDER DETECTION DEVICE AND ARTICULATION DISORDER DETECTION METHOD

(71) Applicant: Panasonic Holdings Corporation, Osaka (JP)

(72) Inventors: Akiho Sakurai, Osaka (JP); Takahiro Kamai, Kyoto (JP); Katsunori Daimou, Osaka (JP); Tomoki Ogawa, Osaka (JP); Shogo Takahata, Osaka (JP); Seiki Nagao, Tokyo (JP); Kazunori Kawami, Kyoto (JP)

(73) Assignee: Panasonic Holdings Corporation, Osaka (JP)

( * ) Notice: Subject to any disclaimer, the term of this patent is extended or adjusted under 35 U.S.C. 154(b) by 195 days.

(21) Appl. No.: 18/851,154

(22) PCT Filed: Mar. 9, 2023

(86) PCT No.: PCT/JP2023/009135

§ 371 (c)(1),
(2) Date: Sep. 26, 2024

(87) PCT Pub. No.: WO2023/189379

PCT Pub. Date: Oct. 5, 2023

(65) Prior Publication Data

US 2025/0210059 A1 Jun. 26, 2025

(30) Foreign Application Priority Data

Mar. 29, 2022 (JP) ................................ 2022-054156

(51) Int. Cl.

| | |
|---|---|
| ***G10L 25/66*** | (2013.01) |
| ***G10L 21/10*** | (2013.01) |
| ***G10L 25/30*** | (2013.01) |

(52) U.S. Cl.
CPC .............. *G10L 25/66* (2013.01); *G10L 25/30* (2013.01); *G10L 21/10* (2013.01)

(58) Field of Classification Search
CPC .......... G10L 25/66; G10L 25/30; G10L 21/10
See application file for complete search history.

(56) References Cited

U.S. PATENT DOCUMENTS

| | | | | |
|---|---|---|---|---|
| 2015/0265205 A1* | 9/2015 | Rosenbek | ................ | A61B 7/00 600/586 |
| 2023/0210451 A1 | 7/2023 | Omiya et al. | | |
| 2025/0322842 A1* | 10/2025 | Ishimaru | ................ | G10L 25/03 |

FOREIGN PATENT DOCUMENTS

| | | | | |
|---|---|---|---|---|
| EP | 4139935 B1 * | 2/2026 | ............ | G10L 25/66 |
| JP | 6854554 B1 | 4/2021 | | |
| WO | WO-2021213935 A1 * | 10/2021 | ............ | G16H 50/30 |

OTHER PUBLICATIONS

International Search Report dated May 30, 2023 issued in International Patent Application No. PCT/JP2023/009135, with English translation.

* cited by examiner

*Primary Examiner* — Mohammad K Islam
(74) *Attorney, Agent, or Firm* — RIMON P.C.

(57) ABSTRACT

This articulation disorder detection device comprises: a section detection unit for detecting a section in which the value of a first line obtained by averaging, using a first window length, speech sound data obtained by having a subject to repeatedly utter a speech sound module is greater than the value obtained by multiplying, by a positive real number, the value of a second line obtained by averaging, using a second window length, the speech sound data; and a determination unit for determining an articulation disorder on the basis of the detection result of the section detection unit.

9 Claims, 8 Drawing Sheets

ARTICULATION DISORDER DETECTION DEVICE AND ARTICULATION DISORDER DETECTION METHOD

CROSS-REFERENCE OF RELATED APPLICATIONS

This application is the U.S. National Phase under 35 U.S.C. § 371 of International Patent Application No. PCT/JP2023/009135, filed on Mar. 9, 2023, which in turn claims the benefit of Japanese Patent Application No. 2022-054156, filed on Mar. 29, 2022, the entire disclosures of which Applications are incorporated by reference herein.

TECHNICAL FIELD

The present disclosure relates to an articulation disorder detection apparatus and an articulation disorder detection method.

BACKGROUND ART

When a motion disorder occurs due to a cerebrovascular accident, a traffic accident, or the like, the command to move muscles such as the lips or the tongue may not work properly, and a pronunciation disorder (hereinafter, an articulation disorder) may occur. In such an articulation disorder, sounds may be heard as connected as a whole, or the rhythm and speed of a sound may be disturbed due to the inaccurate movement of the tongue or similar muscles. For this reason, conversation tends to become unclear.

For example, Patent Literature 1 discloses, as an apparatus that detects an articulation disorder or the like in a test subject, a configuration in which a disease or a symptom of a test subject is estimated based on a feature amount extracted from voice data that the test subject has vocalized and a spectrogram image generated from the voice data.

CITATION LIST

Patent Literature

PTL 1

Japanese Patent No. 6854554

SUMMARY OF INVENTION

Technical Problem

When such an articulation disorder can be detected quickly, the options of treatment increases and it is easier to alleviate symptoms. Therefore, an apparatus capable of quickly detecting symptoms of an articulation disorder is desired.

An object of the present disclosure is to provide an articulation disorder detection apparatus and an articulation disorder detection method each capable of detecting an articulation disorder quickly.

Solution to Problem

An articulation disorder detection apparatus according to the present disclosure includes:

a first line generator that generates a first line by averaging voice data obtained by causing test subject to repeatedly vocalize a voice module including a plosive, the averaging being performed with a first window length set to be equal to or less than a standard vocalizing time of the plosive;

a second line generator that generates a second line by averaging the voice data with a second window length set to be equal to or more than a standard time of the voice module and equal to or less than twice the standard time;

a section detector that detects at least one section in which a value of the first line is larger than a value obtained by multiplying a value of the second line by a predetermined positive real number; and a determiner that determines an articulation disorder based on a detection result of the section detector.

An articulation disorder detection method according to the present disclosure includes:

generating a first line obtained by averaging voice data obtained by causing a test subject to repeatedly vocalize a voice module including a plosive, the averaging being performed with a first window length set to be equal to or less than a standard vocalizing time of the plosive;

generating a second line obtained by averaging the voice data with a second window length set to be equal to or more than a standard time of the voice module and equal to or less than twice the standard time;

detecting a section in which a value of the first line is larger than a value obtained by multiplying a value of the second line by a predetermined positive real number; and determining an articulation disorder based on a result of the detecting of the section.

According to the present disclosure, it is possible to quickly detect an articulation disorder.

DESCRIPTION OF EMBODIMENTS

Embodiment

Figure 1:
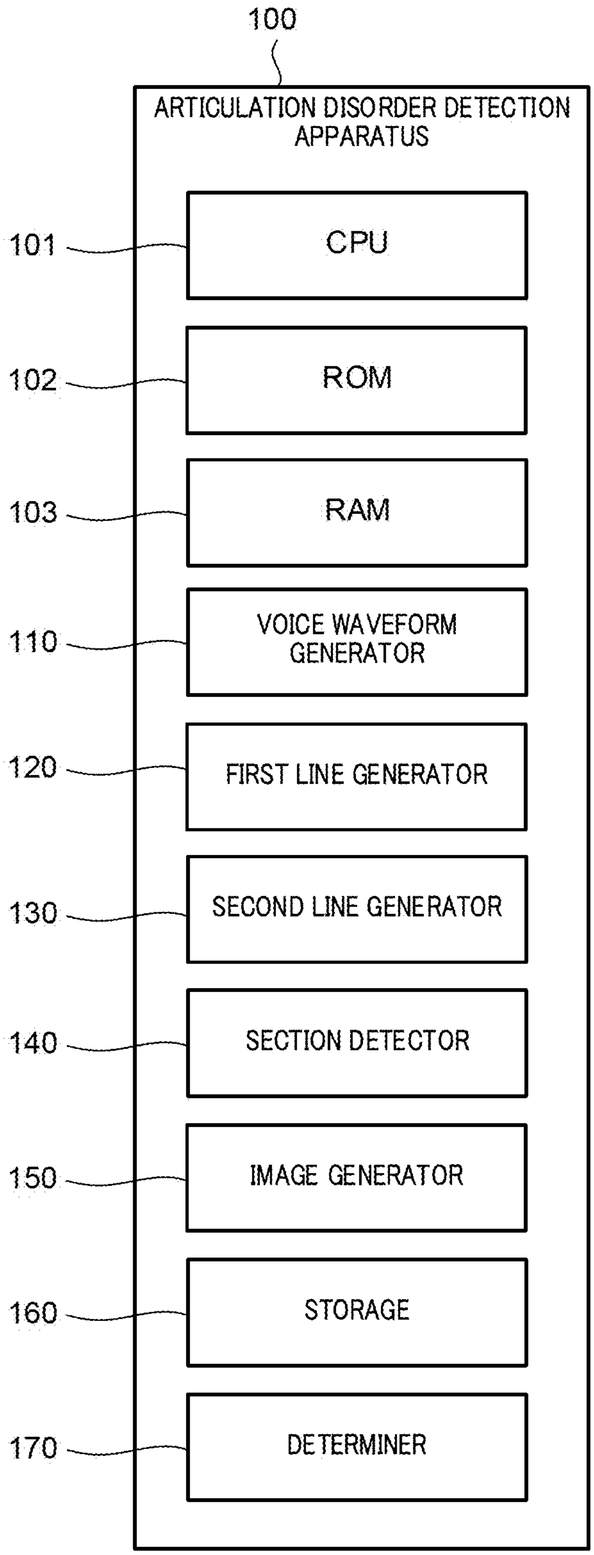
FIG. 1 is a block diagram illustrating a configuration example of an articulation disorder detection apparatus according to an embodiment of the present disclosure.

Hereinafter, the embodiment of the present disclosure will be described in detail based on the drawings. FIG. 1 is a block diagram illustrating a configuration example of articulation disorder detection apparatus 100 according to the embodiment of the present disclosure.

As illustrated in FIG. 1, articulation disorder detection apparatus 100 is an apparatus that detects an articulation disorder based on voice data voiced by a test subject. Articulation disorder detection apparatus 100 includes central processing unit (CPU) 101, read only memory (ROM) 102, random access memory (RAM) 103, and an input/output circuit (all not illustrated), and detects the articulation disorder of the test subject based on a preset program.

Articulation disorder detection apparatus 100 includes voice waveform generator 110, first line generator 120, second line generator 130, section detector 140, image generator 150, storage 160, and determiner 170.

Voice waveform generator 110 acquires voice data acquired when a test subject repeatedly vocalize a predetermined voice module a predetermined number of times, and generates a voice waveform based on the acquired voice data.

The predetermined voice module is an element for a test subject to continuously vocalize a plurality of sounds. For example, the voice module may be configured to include a voiced plosive as an initial syllable and a voiced tap that follows the initial syllable.

The voiced plosive is a sound that is relatively easy to pronounce even for a test subject having an articulation disorder, that is, a test subject who has paralysis of the tongue, and is "de" in the present embodiment. The voiced tap is a sound that is difficult to pronounce for a test subject who has paralysis of the tongue, and in the present embodiment, the voiced tap is "re." In the present embodiment, "dere," which is obtained by continuously vocalizing "de" and "re," thus becomes the voice module.

Figure 2:
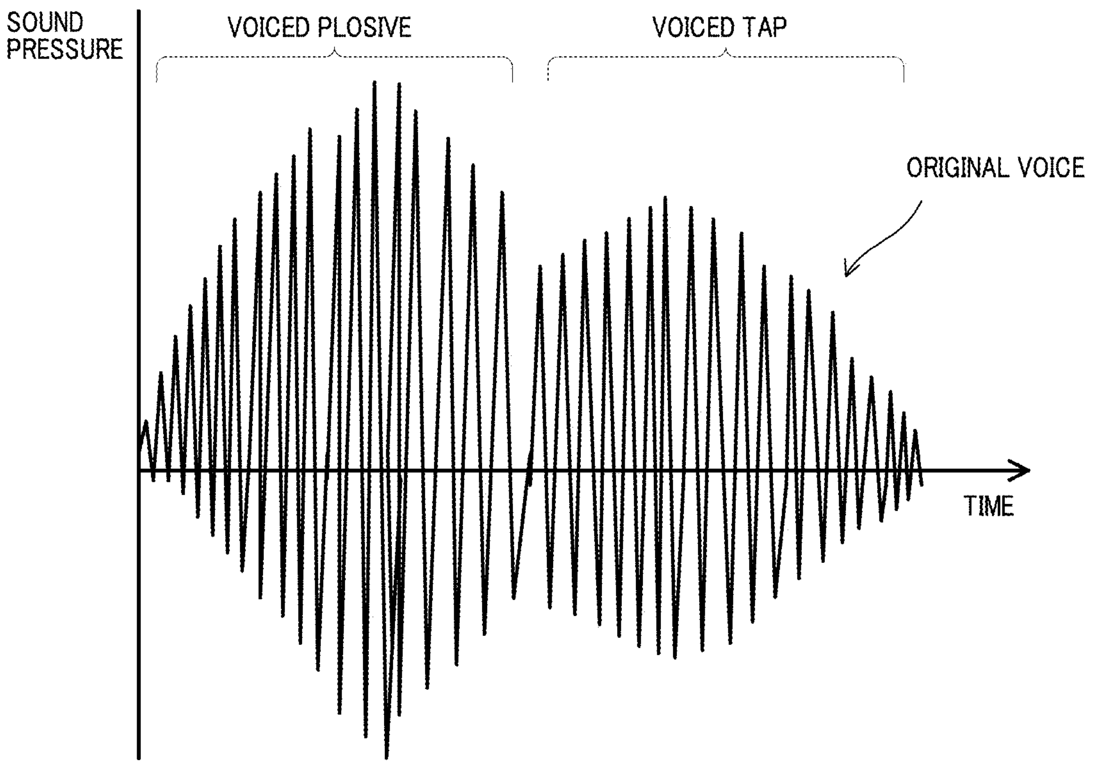
FIG. 2 illustrates an example of a voice waveform when a test subject vocalizes a voice module.

For example, the time change in the sound pressure level of the original voice when a test subject vocalizes "dere" becomes a vibration waveform as illustrated in FIG. 2. The left portion in FIG. 2 is a waveform corresponding to the voiced plosive "de," and the right portion is a waveform corresponding to the voiced tap "re."

The sound pressure level of each sound varies to decrease after reaching a peak value. Further, since the test subject vocalizes the voiced plosive and the voiced tap continuously, the sound pressure level transitions such that the sound pressure level slightly decreases from the peak value of the voiced plosive and then increases again toward the peak value of the voiced tap.

Further, FIG. 2 illustrates an example in which the peak value of the voiced plosive is larger than the peak value of the voiced tap, since the voiced plosive is easier to pronounce than the voiced tap.

Voice waveform generator 110 acquires the original voice by causing a test subject to vocalize "dere," for example, eight times repeatedly, and generates the time-series data of the sound pressure level of the original voice as a voice waveform. Time-series data in which eight voice waveforms as illustrated in FIG. 2 are lined up is thus generated (not illustrated).

First line generator 120 generates a first line for determining whether one sound is vocalized by the test subject during the standard vocalizing time.

The first line is an envelope constituted by values, each of which is a root mean square (RMS) of the sound pressure level in voice data, calculated for each first window length.

The standard vocalizing time is, for example, a time during which the test subject can naturally vocalize one sound without any constraint, and can be set to any period of time. In the present embodiment, the standard vocalizing time is set to, for example, 175 ms. That is, in the present embodiment, the time for the test subject to vocalize the voice module constituted by two sounds once is set to 350 ms, which is twice the standard vocalizing time.

The first window length is set to be equal to or less than the standard vocalizing time. In a case where one sound is accurately vocalized within the standard vocalizing time, the peak value of the sound pressure level would be present within the standard vocalizing time when the test subject vocalizes one sound. For example, when the first window length is set to a time longer than the standard vocalizing time, the peak values of the two sounds may fall within a single first window length. Therefore, by setting the first window length to be equal to or less than the standard vocalizing time, it is possible to accurately extract the peak value of the sound pressure level when the test subject vocalizes one sound.

In the present embodiment, the first window length is set to, for example, ⅓ or more (approximately 64 ms) of the standard vocalizing time, in consideration of the fluctuation in the vocalization of one sound within the standard vocalizing time.

Figure 3:
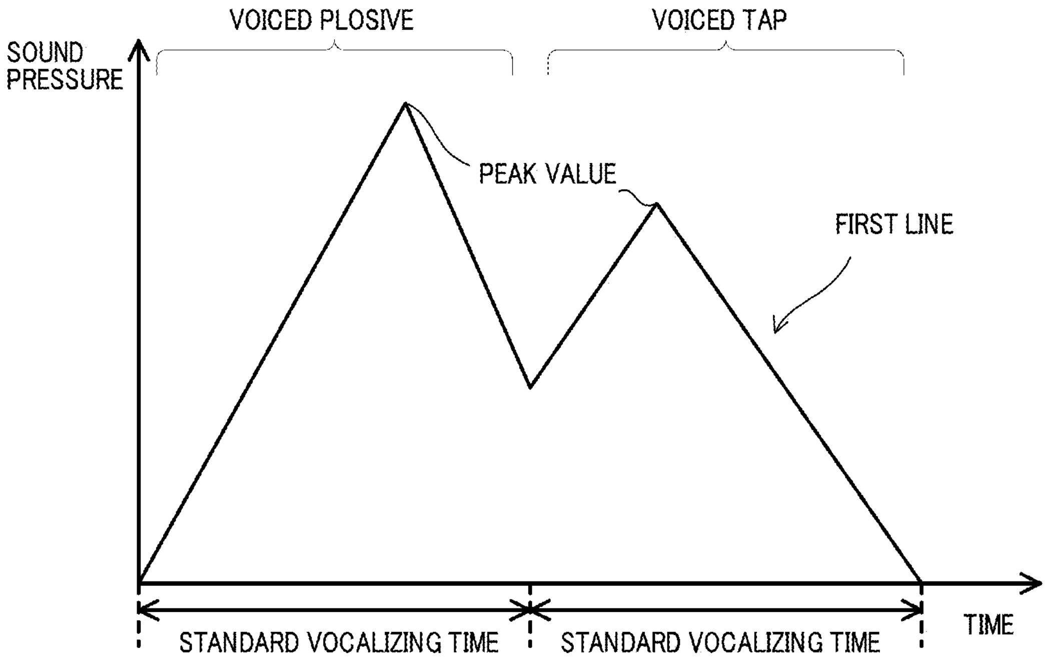
FIG. 3 illustrates an example of a first line generated based on the voice waveform.

Since the sound pressure level typically becomes data that repeats fine vibrations (see FIG. 2), the first line, by root mean squaring the sound pressure level within the standard vocalizing time, becomes a line that indicates the outline of the sound pressure level in the standard vocalizing time, as illustrated in FIG. 3. Specifically, the first line represents a continuous line including a portion with a peak value corresponding to the voiced plosive and a portion with a peak value corresponding to the voiced tap.

More specifically, first line generator 120 sets the first window length based on the standard vocalizing time and generates the first line by using the set first window length to average the voice waveforms generated by voice waveform generator 110.

Within the standard time of the voice module (twice the standard vocalizing time), second line generator 130 generates a second line that serves as a threshold value for determining whether the test subject has been able to accurately vocalize the voice module.

Since the voice module is repeatedly vocalized by a test subject, the voice waveform is considered to exhibit a time change in which the waveform related to the vocalization of the speech module is repeated at a constant cycle.

Figure 4:
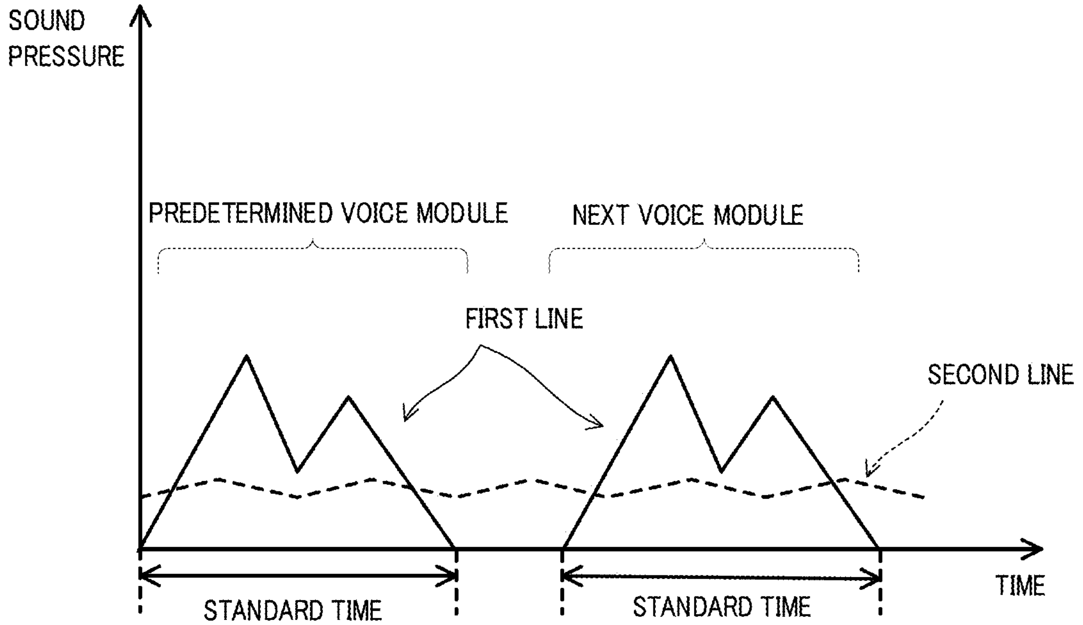
FIG. 4 illustrates an example of a second line generated based on a first line.

For example, FIG. 4 illustrates a case where the vocalization of a predetermined voice module ends, the sound pressure level decreases, and then the vocalization of the next voice module starts.

It is considered that one voice module is vocalized at each constant cycle when the test subject accurately vocalizes the voice module a predetermined number of times. Therefore, with the constant cycle set as a second window length, second line generator 130 generates the second line by averaging the voice waveforms using the second window length.

The second line is an envelope constituted by values, each of which is the root mean square of the sound pressure level in the voice data, calculated for each second window length.

The second window length is set to, for example, a time equal to or longer than a standard time and equal to or shorter than twice the standard time, such that a period during which a test subject (a healthy individual) is vocalizing and a period between two voice modules (a period during which the test subject is not vocalizing) are included.

For example, the standard time is the time length in which the test subject vocalizes the two sounds “de” and “re,” and corresponds to twice the standard vocalizing time (350 ms). The second window length can be, for example, set to a value obtained by adding the standard time and the time length (any time length) in which the test subject naturally starts vocalizing the next voice module after ending vocalizing a predetermined voice module. In the present embodiment, the any time length is set to, for example, 150 ms. That is, in this embodiment, the second window length is set to 500 ms, which is obtained by adding 350 ms and 150 ms.

In the second window length, there is a period in which sound is vocalized and a period in which sound is not vocalized. Therefore, the second line (representing the average of these periods) indicates a value lower than the peak value of one sound in the first line, that is, serving as a threshold value for determining the presence of the peak value.

Section detector 140 compares the first line and the second line, and detects a section in which the value of the first line is larger than a value obtained by multiplying the value of the second line by a predetermined positive real number. The predetermined positive real number may be, for example, 1 or may be a value that can be set as appropriate according to a method for detecting a to be described below. In the following description, a value obtained by multiplying the value of the second line by a predetermined positive real number will be simply referred to as the value of the second line.

For example, when the voice module is accurately vocalized, the value of the first line becomes larger than the value of the second line during the period in which “dere” is vocalized due to the presence of peak values of the sound pressure levels of the sounds. In contrast, the period from the end of one voice module’s vocalization to the start of the next voice module’s vocalization is a period in which no voice is generated, and thus, the value of the first line becomes smaller than the value of the second line. Hereinafter, a detection value when the value of the first line is larger than the value of the second line is defined as 1, and a detection value when the value of the first line is equal to or smaller than the value of the second line is defined as 0.

Figure 5:
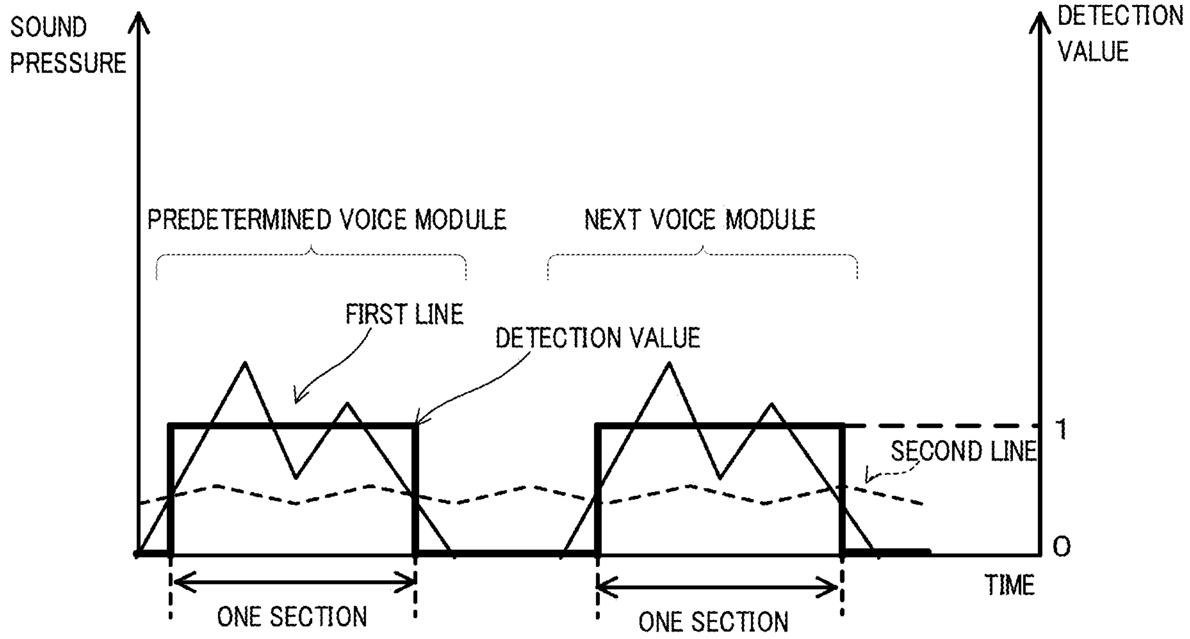
FIG. 5 illustrates an example of a detection value based on the first line and the second line.

For this reason, as illustrated in FIG. 5, when the voice module is accurately vocalized, the section in which the detection value becomes 1 is detected the number of times the voice module is repeated, and the length of the section becomes substantially constant.

However, when one of the sounds in the voice module is not vocalized, the value of the first line is more likely to be equal to or less than the value of the second line, and thus, at least, the length of the section in which the value is one becomes shorter than when the voice module is accurately vocalized. For example, a test subject with an articulation disorder has difficulty in vocalizing a voiced tap as described above, and thus, when the test subject vocalizes “dere,” the “re” is not accurately vocalized, and the length of the section is more likely to become shorter than the standard time.

Figure 6A:
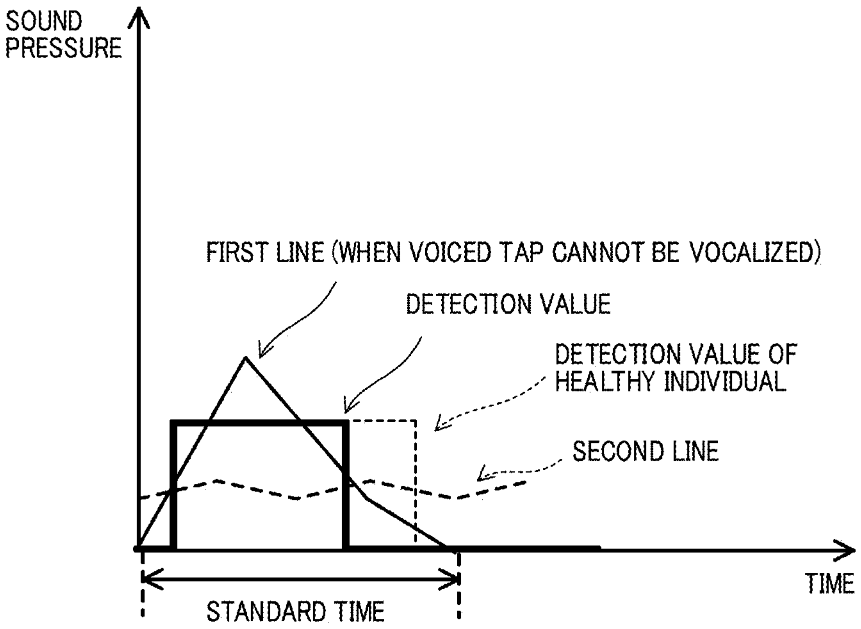
FIG. 6A illustrates an example of a detection value when a voiced tap cannot be vocalized in the voice module.

For example, as illustrated in FIG. 6A, when a test subject with an articulation disorder relatively accurately vocalizes “de” (namely a voiced plosive) but cannot vocalize “re” (namely a voiced tap), the sound pressure level of the portion of the voiced tap in the first line decreases. Therefore, the length of the section that becomes 1 is, for example, shorter than the detection value in the case of a healthy individual. The detection value in the case of a healthy individual is the detection value obtained when the test subject who is a healthy individual without an articulation disorder accurately vocalizes the voice module.

Further, when a test subject vocalizes the first sound of “de” for an extended period, the length of the section where the determination result becomes 1 exceeds the time for vocalizing one voice module. For example, a test subject with an articulation disorder may find it relatively easy to vocalize a voiced plosive, but when repeating the voice module, may have difficulty in moving the tongue and may vocalize the sound of “de” for an extended period in one voice module. In this case, the length of the section is more likely to become longer than the standard time.

Figure 6B:
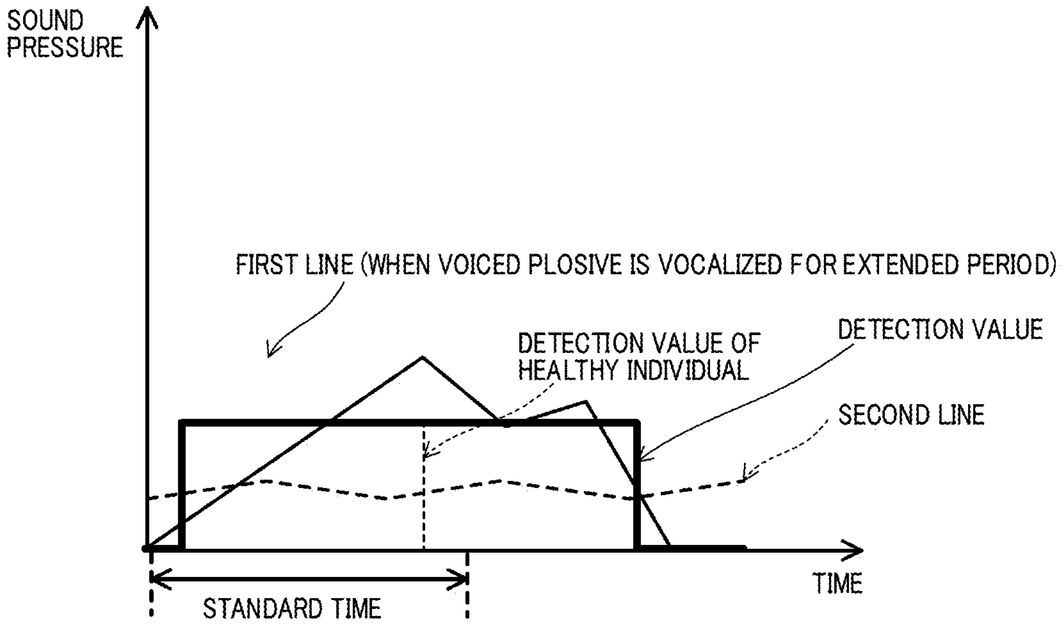
FIG. 6B illustrates an example of a detection value when the voiced plosive cannot be vocalized in the voice module.

For example, as illustrated in FIG. 6B, when a test subject with an articulation disorder vocalizes “de” (namely a voiced plosive) for an extended period, and vocalizes “re” (namely a voiced tap), the portion of the voiced plosive in the first line becomes longer. Therefore, the length of the section becoming 1 becomes, for example, longer than the detection value in the case of a healthy individual.

As described above, by detecting a section where the value becomes 1, section detector 140 can determine the number of sections where the value is 1 and the length of each section.

Section detector 140 may detect which of the value of the first line and the value of the second line is larger by using the equation 1 below or by another method (for example, a method of simply comparing the value of the first line and the value of the second line) other than equation 1.

$$\text{Detection value} = \{1,\ (\text{Rms1} > a \times \text{Rms2})\ \text{AND}\ (\text{Rms1} > 0.3 \times \text{Rms3}),\ 0,\ \text{otherwise} \tag{1}$$

Rms1 in equation 1 is the value of the first line, and Rms2 is the value of the second line. Rms3 is the average value for the first line. In equation 1, a is an adjustment coefficient that takes variations for each voice module into consideration. Specifically, a may be changed in a range of, for example, 0.3 or more and 0.9125 or less, and, for example, a value that minimizes the evaluation function represented by the following equation 2 may be selected.

$$F(a) = std(dur) + std(\text{interval}) + 100 \times Erest \tag{2}$$

In equation 2, std(dur) is the standard deviation of the detected section lengths (dur), std(interval) is the standard deviation of the distances between the center positions of the detected sections (interval), and Erest is the energy of a section that is not detected.

In equation 1, the detection value becomes 1 when “(Rms1>a×Rms2) AND (Rms1>0.3×Rms3)” is satisfied, and otherwise the detection value becomes 0.

As described above, by applying the adjustment coefficient that minimizes the variation in each section to equation 1, it is possible to detect sections even when a section with a large degree of variation compared to the others presents, while controlling the degree of variation.

Figure 7:
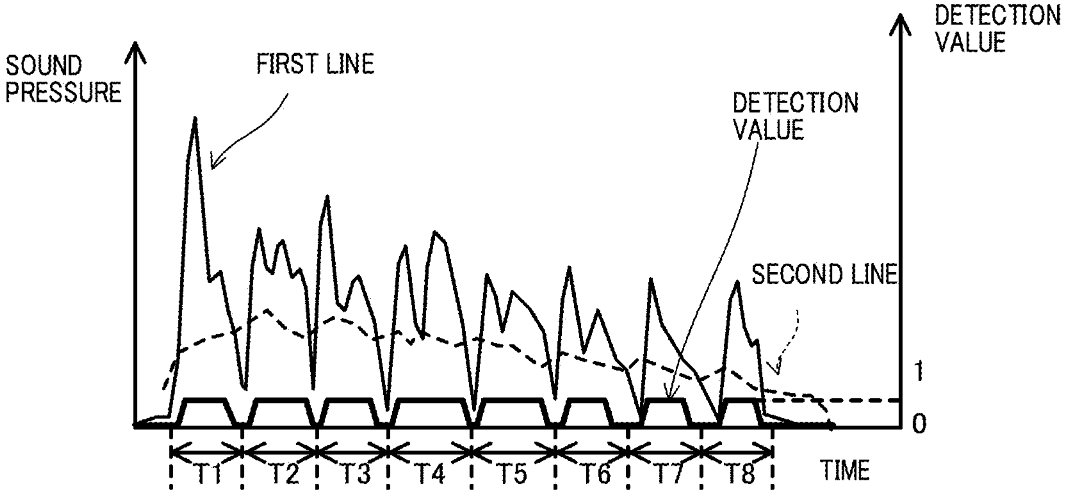
FIG. 7 illustrates an example of the first line, the second line, and the detection value when a test subject repeats the voice module eight times.

The actual data of the first line (Rms1) and the second line (Rms2) when a test subject repeatedly vocalize the voice module eight times is, for example, as illustrated in FIG. 7. FIG. 7 illustrates a first line (Rms1) and a second line (Rms2) that are obtained in relatively different shapes. The time of each voice module is indicated by the range T1, T2, T3, T4, T5, T6, T7, or T8.

The first line in FIG. 7 is configured such that, basically, there are two rising edges of "de" and "re" in each of T1, T2, T3, T4, T5, T6, T7, and T8. Further, in the first line illustrated in FIG. 7, there are three rising edges in, for example, T2, and there is only one rising edge in T7.

Section detector 140 compares the value of the first line with the value of the second line, for example, using equation 1 from the data illustrated in FIG. 7, and detects a section in which the value becomes 1. In the example illustrated in FIG. 7, although the lengths of the respective sections vary, eight sections are detected.

Image generator 150 generates a spectrogram image based on the original voice. Specifically, the original voice in the section detected by section detector 140 is subjected to Fourier transformation to generate a spectrogram image.

For example, since the length of one section corresponds to two standard vocalizing times (the vocalizing time for one voice module), the spectrogram image corresponding to the voice of one voice module would have a substantially constant width when the voice module is vocalized accurately. When the voice module is vocalized accurately, spectrogram images corresponding to the respective sections are more likely to be generated with substantially equal widths.

Figure 8A:
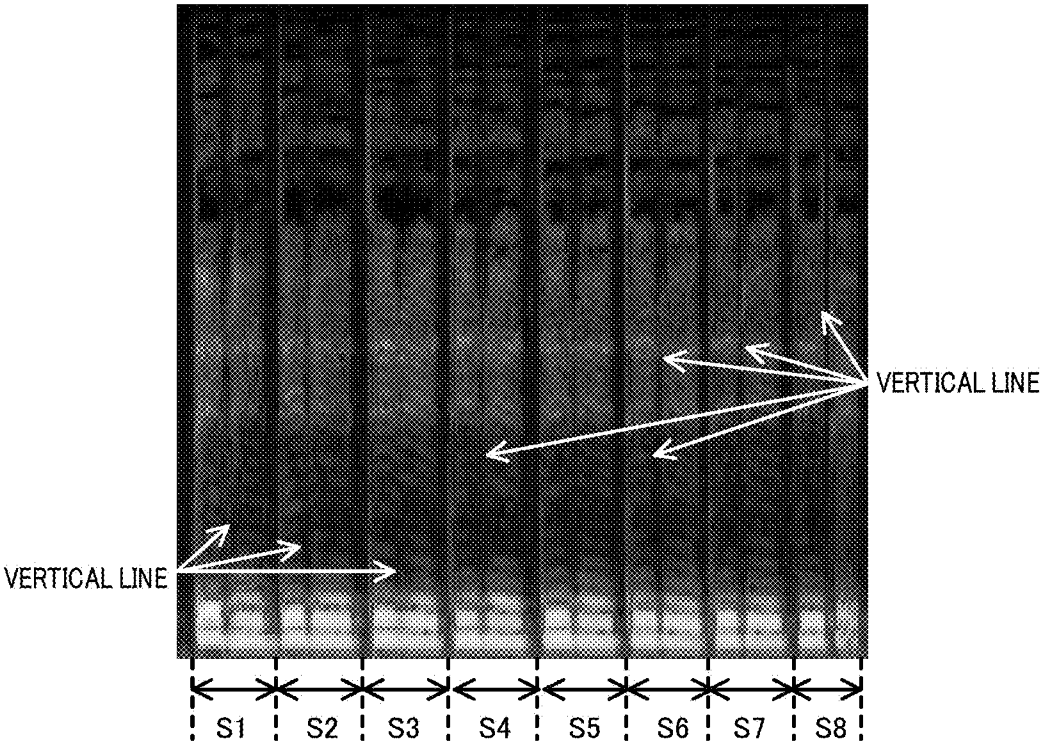
FIG. 8A illustrates an example of a spectrogram image of a healthy individual.

When the voice module is vocalized accurately, the eight sections S1, S2, S3, S4, S5, S6, S7, and S8 detected by section detector 140 have substantially equal widths, for example, as illustrated in FIG. 8A.

Further, the sound pressure level rises at each of the two sounds "de" and "re," and thus, the sound pressure level drops at the portion corresponding to the interval between the two sounds. Accordingly, it can be confirmed that the spectrogram image includes vertical lines that separate the sounds in each section.

When, however, one of the two sounds is not vocalized in the voice module, the spectrogram image corresponding to the one sound has a width shorter than when the voice module is vocalized accurately. Further, when the test subject cannot accurately vocalize the sound of the voice module and vocalizes the sound of the first "de" for an extended period, the spectrogram image corresponding to that case has a width longer than when the voice module is accurately vocalized.

Further, since a test subject having an articulation disorder has difficulty in moving the tongue, when the test subject repeatedly vocalize the voice module, the test subject may vocalizes the sound of "de" (namely a voiced plosive that is easy to vocalize) for an extended period and may start vocalizing the next voice module without vocalizing "re" (namely a voiced tap), and thus, there may be cases where spectrogram images with long widths and spectrogram images with short widths are generated in a mixed manner.

Figure 8B:
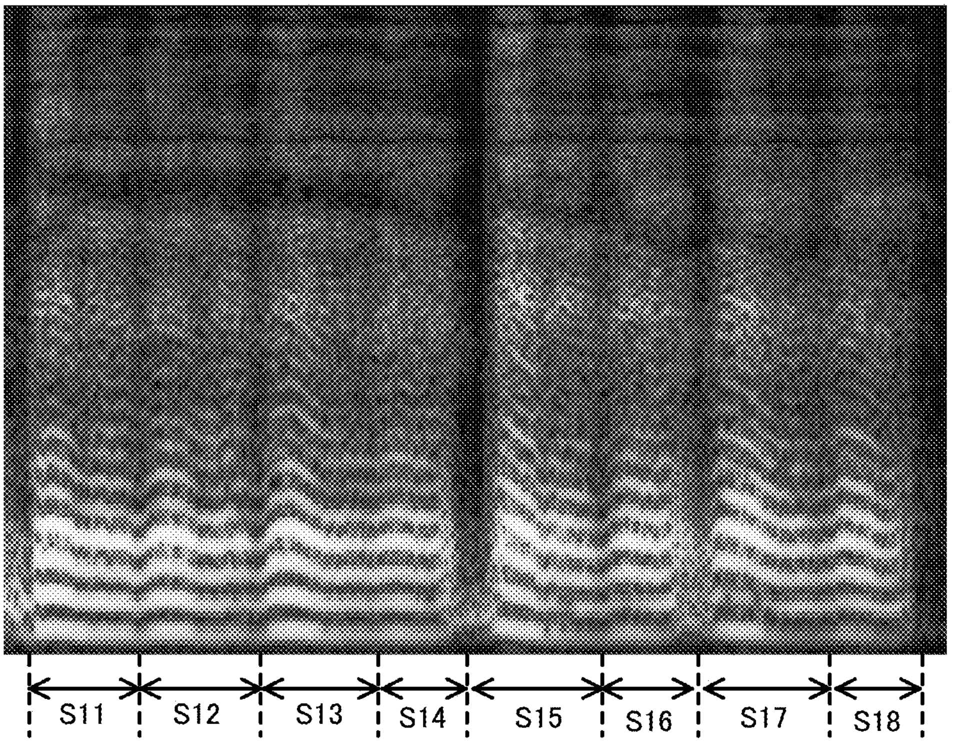
FIG. 8B illustrates an example of a spectrogram image of a test subject with an articulation disorder.

When the test subject with an articulation disorder vocalizes the voice module, for example, a spectrogram image in which eight sections S11, S12, S13, S14, S15, S16, S17, and S18 detected by section detector 140 have relatively long widths and each have widths with large variations is generated, as illustrated in FIG. 8B.

In the example illustrated in FIG. 8B, the test subject with an articulation disorder cannot accurately vocalize "re" after the relatively easy-to-pronounce "de," resulting in a spectrogram image where the vertical line between the two sounds in each section is difficult to recognize, as illustrated in FIG. 8B.

As described above, a clear difference appears in the spectrogram image between a case where the voice is accurately vocalized and a case where the voice is not accurately vocalized.

For this reason, in the present embodiment, a machine learning model is used to determine whether a test subject has an articulation disorder. Specifically, the learning method used in the present embodiment may be, for example, an autoencoder.

An autoencoder is a machine learning model that is trained so that the output data is the same as the input data. In the present embodiment, the presence or absence of an articulation disorder is determined by using the fact that when spectrogram images of vocalization of a voice module by healthy individuals are learned, an abnormal image cannot be appropriately restored upon input.

Storage 160 stores a machine learning model trained with spectrogram images (for example, images as illustrated in FIG. 8A) based on the original voices of a plurality of healthy individuals as training data.

Determiner 170 calculates a score for an spectrogram image of each section detected by section detector 140 based on a machine learning model stored in storage 160. Specifically, a spectrogram image (input image) of a test subject's original voice is input into an autoencoder, and an output image is output from the autoencoder. Then, determiner 170 calculates a difference image between the input image and the output image.

Determiner 170 may calculate the difference image by, for example, squaring all the pixel values of the difference image and calculating the average of the squared pixel values to obtain the mean squared error (score). Determiner 170 may compare the calculated mean squared error with a predetermined threshold value set in advance, and may determine that the test subject has an articulation disorder when the mean squared error is equal to or greater than the predetermined threshold value.

For example, the difference image between a spectrogram image with a wide width in each of the sections as illustrated in FIG. 8B and a spectrogram image of a healthy individual as illustrated in FIG. 8A becomes relatively large due to the difference in the widths of the sections.

For this reason, the articulation disorder can be detected by comparing the score of the difference image with the predetermined threshold value.

Thus, by using a machine learning model trained with spectrogram images of healthy individuals, it is possible to easily determine whether the spectrogram image of a test subject represents an accurately vocalized voice module.

Figure 9:
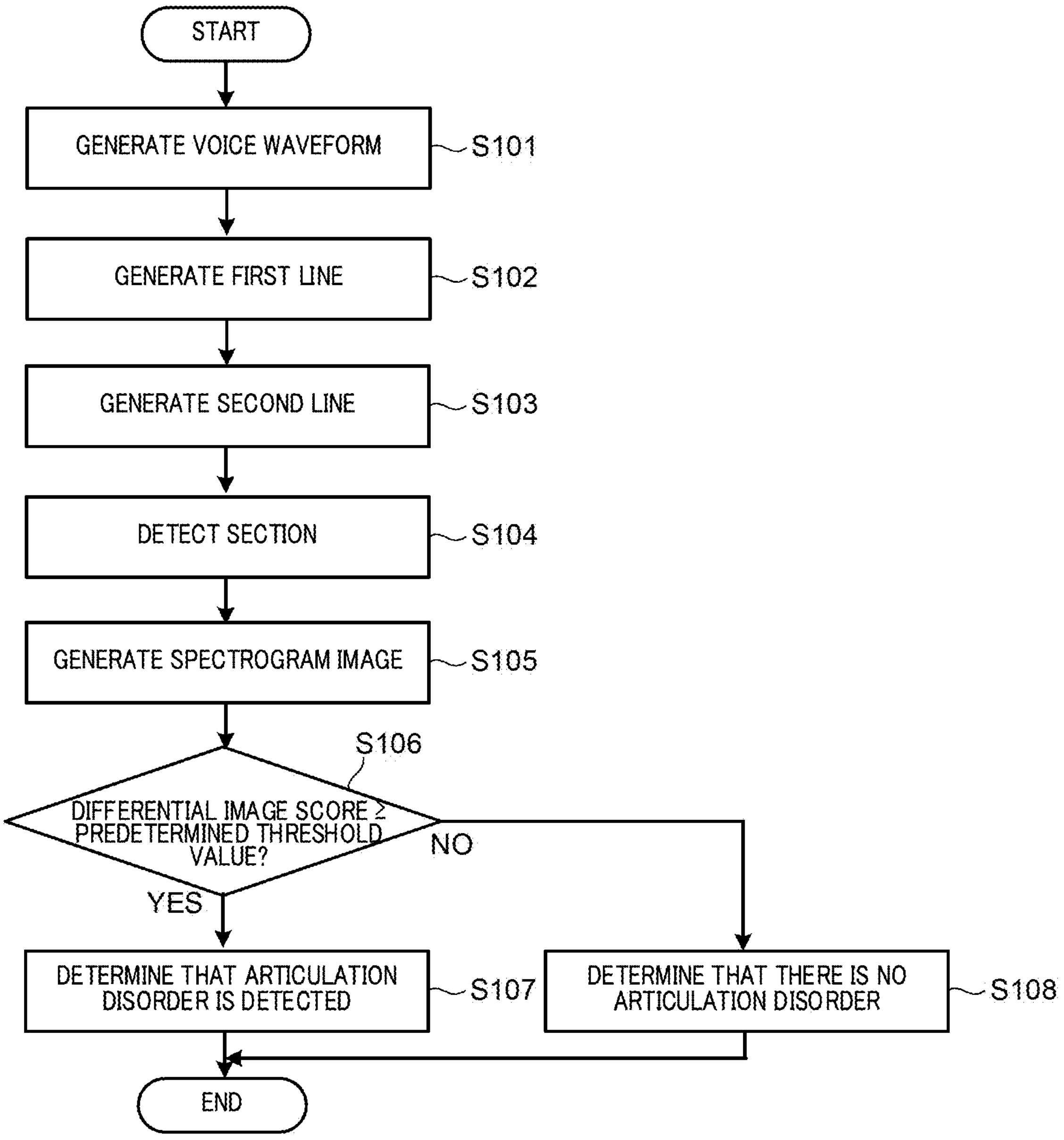
FIG. 9 is a flowchart illustrating an operation example of detection control in the articulation disorder detection apparatus.

Next, an operation example of articulation disorder detection apparatus 100 will be described. FIG. 9 is a flowchart illustrating an operation example of detection control in articulation disorder detection apparatus 100. The processing in FIG. 9 is started, for example, at the timing when the test subject starts vocalizing the voice module.

As illustrated in FIG. 9, articulation disorder detection apparatus 100 acquires the original voice of a test subject and generates a voice waveform (step S101). After step S101, articulation disorder detection apparatus 100 generates a first line based on the sound waveform (step S102) and generates a second line (step S103).

After step S103, articulation disorder detection apparatus 100 compares the first line with the second line, and detects a section in which the value of the first line is larger than the value of the second line (step S104). Next, articulation disorder detection apparatus 100 generates a spectrogram image for each detected section (step S105).

After step S105, articulation disorder detection apparatus 100 calculates a difference image between the generated spectrogram image and the spectrogram image of a healthy individual in the learning model, and determines whether the score of the difference image is equal to or larger than a predetermined threshold value (step S106).

When the result of the determination is that the score of the difference image is equal to or larger than the predetermined threshold value (step S106, YES), articulation disorder detection apparatus 100 determines that an articulation disorder is detected (step S107). When the score of the difference image is less than the predetermined threshold value (step S106, NO), articulation disorder detection apparatus 100 determines that the test subject does not have an articulation disorder (step S108). After step S107 or step S108, the present control ends.

According to the present embodiment configured as described above, an articulation disorder is detected by using the first line and the second line generated from the voice waveform based on the original voice obtained by causing a test subject to repeatedly vocalize a voice module (in which the initial syllable is a voiced plosive) a predetermined number of times.

That is, by causing a test subject to repeat the voice module (which starts with a relatively easy-to-pronounce voiced plosive) a predetermined number of times, the peak value of the sound pressure level of the voice waveform based on the voiced plosive can be easily identified.

Specifically, by making it easier to detect a section larger than the second line in the first line, it is possible to easily detect an articulation disorder based on the detected section.

Specifically, by generating a spectrogram image based on the detected section and comparing the image of the test subject within the detected section to a normal image based on a healthy individual, it becomes easier to detect the articulation disorder.

In the case of a test subject having an articulation disorder, it is possible to easily detect whether the test subject has an articulation disorder since the length or number of the sections to be detected and the spectrogram image are more likely to differ from those of a healthy individual.

Further, by using a voice module that includes a voiced plosive with a relatively easy-to-pronounce sound as the initial syllable, it is possible to easily detect the peak value of the sound pressure level. For example, in a configuration where detection is performed using a sound pressure module without any constraints, the detection result may vary depending on the content of the voice module, potentially preventing quick and accurate detection.

In contrast, in the present embodiment, it is possible to quickly and accurately detect whether a test subject has an articulation disorder by using a voice module in which the peak value of a sound pressure level is easy to detect.

Further, since it is possible to detect the articulation disorder quickly and accurately, it is possible to quickly collaborate with a medical institution with a higher level of expertise, for example. As a result, for example, by visiting a medical institution at an early stage when the degree of the condition is still low, it becomes possible to start treatment early, thereby increasing the treatment options and leading to the alleviation of the symptoms of the articulation disorder.

Further, the first window length is set to be equal to or less than the standard vocalizing time, and thus it is possible to reliably extract the peak value of the sound pressure level of each sound.

Further, by setting the first window length to approximately ⅓ of the standard vocalizing time, it is possible to generate the first line that takes into account the fluctuation in the vocalization of one sound, thereby facilitating the extraction of the peak value of the sound pressure level.

Further, since the voice module includes a voiced plosive that is easy to pronounce and a voiced tap that is difficult to pronounce, it is possible to easily cause a difference between the peak values of the sound pressure levels within the standard time corresponding to one voice module. As a result, it is possible to easily cause differences in the length of a section, the number of sections, and the spectrogram image compared to a normal result. As a result, it is possible to easily detect an articulation disorder.

In the above embodiment, an articulation disorder is detected based on the score based on the machine learning model, but the present disclosure is not limited to the configuration. An articulation disorder may also be detected based on only the detection result of section detector 140.

Specifically, determiner 170 may detect an articulation disorder based on the count number of the sections detected by section detector 140.

For example, when a test subject accurately repeatedly vocalizes a voice module eight times, eight sections are detected. However, when a test subject having an articulation disorder repeatedly vocalizes the voice module in the same manner, eight sections may not be detected.

For example, in a case where a test subject with an articulation disorder vocalizes a predetermined voice module, a section of this voice module and a section of the next voice module may be detected as connected when the test subject vocalizes “de” for an extended period because they have difficulty in moving the tongue.

Further, there is a case where a test subject having an articulation disorder does not accurately vocalize one voice module with two sounds, and the section is not detected.

In these cases, section detector 140 detects less than 8 sections.

Further, when the test subject with an articulation disorder vocalizes a predetermined voice module, there may be a gap between the vocalization timing of “de” and the vocalization timing of “re,” resulting in two sections being detected for one voice module. In such a case, section detector 140 detects more than 8 sections.

For this reason, when the count number of the sections detected by section detector 140 is not the repetition number of the voice module, determiner 170 may detect an articulation disorder.

In this way, it is possible to improve the speed with which an articulation disorder can be detected.

Further, determiner 170 may determine whether to count a section based on the length of the section detected by section detector 140.

For a test subject with an articulation disorder, the section may become longer or shorter as described above, a section that significantly exceeds the standard time (for example, see FIG. 6B) or a section that significantly falls short of the standard time (for example, see FIG. 6A) may be detected.

For this reason, determiner 170 can determine not to count such a section, thereby excluding a section that is clearly affected by an articulation disorder. As a result, it is possible to easily create a difference between the count number of sections related to the test subject having an articulation disorder and the desired number of sections.

Further, when an articulation disorder is detected based on only the detection result of section detector 140, image generator 150 and storage 160 may become unnecessary.

Further, determiner 170 may detect an articulation disorder based on both the count number of sections by section detector 140 and the score based on the learning model.

For example, determiner 170 performs a primary determination of an articulation disorder based on the count number of the sections. In the primary determination, for example, based on the count number of the sections, determination is made as to whether determiner 170 performs the secondary determination or not. The secondary determination is a determination for detecting an articulation disorder based on the score according to the learning model.

For example, when the count number of the sections is not within a predetermined range (for example, the range of 6 to 10 times), determiner 170 determines not to perform the secondary determination, and determines that the test subject has an articulation disorder based only on the result of the primary determination.

Further, when the count number of the sections is within the predetermined range, determiner 170 determines to perform a secondary determination, and performs the secondary determination. Then, in the secondary determination, a detailed determination is made using a spectrogram image or the like.

As described above, it is possible to improve the efficiency of detection by performing a simple determination with the primary determination, and by performing a detailed determination with the secondary determination when the determination cannot be made from the primary determination.

Further, the primary determination and the secondary determination may be performed continuously. By performing determinations in both the primary determination and the secondary determination, it is possible to improve detection accuracy.

Further, the determination may be made again based on the result of the primary determination. When the count number of the sections for the primary determination is clearly incorrect, for example, when there is a failure in the voice acquisition in articulation disorder detection apparatus 100, the detection accuracy can be improved by performing the determination again.

Further, in the above embodiment, an articulation disorder is detected using an autoencoder, but the present disclosure is not limited to the configuration, and an articulation disorder may be detected using a method other than an autoencoder.

A method other than the autoencoder includes, for example, weak abnormality detection.

The weak abnormality detection is a method that uses both normal data and abnormal data for learning. In weak abnormality detection, a metric learning method is used, and learning is progressed such that the positions of the feature amounts of the normal data and the positions of the feature amounts of the abnormal data become farther apart from each other.

Specifically, a deep neural network (DNN) model is trained such that the "distance" between two feature amount vectors reflects the "similarity" of data. For example, a DNN model is trained such that the distance between feature amount vectors becomes small in the case of samples belonging to similar classes, and the distance between feature amount vectors becomes large in the case of samples belonging to dissimilar classes.

In the case of the present embodiment, as the learning of the DNN model progresses, for example, the DNN model is trained such that data on the vocalization by healthy individuals (normal data) is concentrated in one place. Subsequently, the DNN model is trained such that data on vocalization by test subjects with an articulation disorder (abnormal data) is located farther from the data group on vocalization by healthy individuals.

Figure 10A:
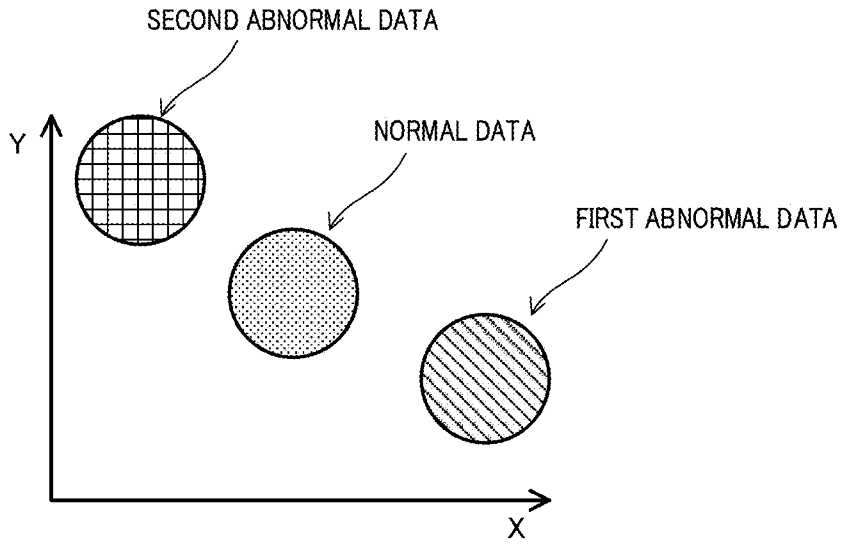
FIG. 10A illustrates an example of the positions of normal data and abnormal data in a two-dimensional coordinate system in weak abnormality detection.

For example, as illustrated in FIG. 10A, in a two-dimensional coordinate system where the horizontal axis is X and the vertical axis is Y, a DNN model is trained such that normal data is located at a certain position, and first abnormal data and second abnormal data are located at positions away from the normal data.

By treating this distance as the degree of abnormality, determiner 170 detects whether the test subject has an articulation disorder.

Figure 10B:
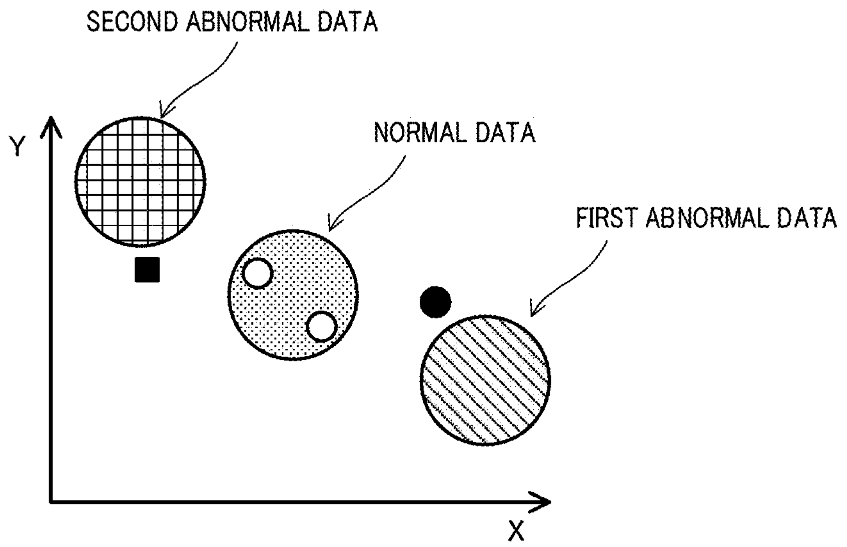
FIG. 10B is a diagram for explaining the positional relationship between input data, normal data, and abnormal data in the two-dimensional coordinate system of FIG. 10A.

For example, as illustrated in FIG. 10B, input data being within the range of normal data means that the input data is located within the range of the normal data in the two-dimensional coordinate system (see the white circles).

On the other hand, input data being closer to the first abnormal data means that the input data is located in a position close to the first abnormal data (see the black circle). Further, input data being closer to the second abnormal data means that the data is located at a position close to the second abnormal data (see black square).

As described above, it is also possible to detect whether or not a test subject has an articulation disorder by treating the distance between the input data and the normal data as the degree of abnormality.

Further, a method other than the autoencoder includes, for example, a time domain abnormality detection method.

The time domain abnormality detection method uses the talking speed and a standard deviation of the center interval of the sections to employ a predetermined index A as a score of the degree of abnormality. The predetermined indicator A is calculated, for example, using the following equation 3.

$$A = 1/\mathrm{Mpsec} + w\sigma \quad (3)$$

Mpsec is the average value of the talking speed when the test subject continues to speak the number of times of vocalization of the voice module; σ is the standard deviation of the center intervals of the sections detected by section detector 140; w is a weighting coefficient and is a value (for example, 2) determined experimentally; and a center interval of sections is the center interval between adjacent sections.

According to a technique for evaluating the impression of speech by using Mpsec and σ (Yu Nishida, et al., "A Proposal of Evaluation Index of Acoustic Feature for Deciding Element Sense Received from Speech"; FIT 2017, The 16th Forum on Information Technology, J-018, pp. 377-378), it is possible to evaluate the degree to which the voice is perceived as clear using Mpsec, and the degree to which the voice is perceived as having intonation using σ.

By using such index A, for example, when σ becomes large, the variance of the center interval between sections becomes large, and thus it is possible to detect that the rhythm of vocalization of the voice module by the test subject is disturbed. That is, by setting the acceptable range of index A based on healthy individual data, determiner 170 can detect an articulation disorder when the index calculated from the test subject's data falls outside this acceptable range.

Further, in the above embodiment, the voice module includes two continuous sounds, namely a voiced plosive and a voiced tap. However, the present disclosure is not limited to the configuration. The voice module may be configured in any manner as long as it includes a voiced plosive. For example, the voice module does not have to include a voiced tap or may include three or more sounds. However, having a test subject vocalize with varying strengths in a voice module makes it easier to create a difference in a section to be detected, it is preferable that the voice module includes two continuous sounds, namely a voiced plosive and a voiced tap.

Further, in the above embodiment, the test subject is asked to repeatedly vocalize the voice module eight times, but the present disclosure is not limited to the configuration, and the voice module may be repeatedly vocalized a number of times different from eight.

Further, in the above embodiment, the first window length has been set to be equal to or less than the standard vocalizing time and equal to or more than ⅓ (one-third) of the standard vocalizing time, but the present disclosure is not limited to the configuration, and the lower limit value of the first window length may be set to any value as long as the first window length is equal to or smaller than the standard vocalizing time. Further, as long as the second window length is set longer than the first window length as in the above embodiment, the second window length may be appropriately set so that a section can be suitably detected. Further, for a window function, for example, a window function in which both ends smoothly attenuate, such as a Hanning window, may be used.

Further, in the above embodiment, the voiced plosive is "de," but the present disclosure is not limited to the configuration. The voiced plosive may be any sound as long as it is a relatively easy-to-pronounce sound, such as "be" or "ge" in which the vowel in the syllable is "e."

Further, in the above embodiment, the voiced plosive is the initial syllable of the voice module, but the present disclosure is not limited to the configuration, and the voiced plosive may be a syllable other than the initial syllable of the voice module.

Further, in the above embodiment, the voiced tap is "re," but the present disclosure is not limited to the configuration. The voiced tap may be any sound as long as it is a relatively difficult-to-pronounce sound.

Further, in the embodiment described above, a tap is included in the voice module, but the present disclosure is not limited to the configuration, and a tap does not have to be included. A voice module that does not include a tap may include, for example, a sound other than a tap, such as "rui."

Further, in the above embodiment, the sound of the voice module is a sound obtained by combining "de" and "re," but the present disclosure is not limited to the configuration. For example, the voice module may include a sound in which the consonant of a syllable (indicating a voiced plosive) is g or b. Examples of the voice module including the consonant g or b in a syllable indicating the voiced plosive include gap, girl, gas, ago, again, bag, big, and better.

Further, in the embodiment described above, a voiced plosive is included in the voice module, but the present disclosure is not limited to the configuration. For example, a voiceless plosive may be included in the voice module. Consonants in a syllable indicating a voiceless plosive include, for example, p which is a voiceless bilabial plosive, t which is a voiceless alveolar plosive, k which is a voiceless velar plosive, and the like. Examples of the voice modules including a voiceless plosive include come, cap, kill, kind, speak, attack, and chaos.

Further, the voice module may include, for example, a plosive such as "po" or "pa."

Further, in the above embodiment, the first line and the second line are calculated by calculating the root mean square of voice waveforms, but the first line and the second line may also be calculated by another method of averaging the voice waveforms.

The embodiments above are no more than specific examples in implementing the present disclosure, and the technical scope of the present disclosure is not to be construed in a limitative sense due to the specific examples. That is, the present disclosure can be implemented in various forms without departing from its spirit or features.

The disclosure of Japanese Patent Application No. 2022-054156, filed on Mar. 29, 2022, including the specification, drawings and abstract, is incorporated herein by reference in its entirety.

INDUSTRIAL APPLICABILITY

The articulation disorder detection apparatus of the present disclosure is useful as an articulation disorder detection apparatus and for an articulation disorder detection method both capable of quickly detecting an articulation disorder.

REFERENCE SIGNS LIST

100 Articulation disorder detection apparatus
110 Voice waveform generator
120 First line generator
130 Second line generator
140 Section detector
150 Image generator
160 Storage
170 Determiner

The invention claimed is:

1. An articulation disorder detection apparatus, comprising:

a first line generator that generates a first line by averaging voice data obtained by causing a test subject to repeatedly vocalize a voice module including a plosive, the averaging being performed with a first window length set to be equal to or less than a standard vocalizing time of the plosive;

a second line generator that generates a second line by averaging the voice data with a second window length set to be equal to or more than a standard time of the voice module and equal to or less than twice the standard time;

a section detector that detects at least one section in which a value of the first line is larger than a value obtained by multiplying a value of the second line by a predetermined positive real number; and a determiner that determines an articulation disorder based on a detection result of the section detector.

2. The articulation disorder detection apparatus according to claim 1, further comprising:

an image generator that generates an image based on the voice data; and a storage that stores a learning model trained using images based on original voices from a plurality of healthy individuals as training data, wherein the determiner calculates, based on the learning model, a score for each of the at least one section detected by the section detector, and determines the articulation disorder based on the calculated score.

3. The articulation disorder detection apparatus according to claim 1, wherein the determiner determines the articulation disorder based on a count number of the at least one section detected by the section detector.

4. The articulation disorder detection apparatus according to claim 3, wherein the determiner determines whether to count the at least one section based on a length of the at least one section detected by the section detector.

5. The articulation disorder detection apparatus according to claim 1, wherein the first line generator sets the first window length to be equal to or more than ⅓ of the standard vocalizing time.

6. The articulation disorder detection apparatus according to claim 1, wherein the plosive is an initial syllable of the voice module.

7. The articulation disorder detection apparatus according to claim 1, wherein the voice module includes the plosive and a voiced tap that is continuous with the plosive.

8. The articulation disorder detection apparatus according to claim 1, wherein a vowel of a syllable of the plosive is /e/.

9. An articulation disorder detection method, comprising:

generating a first line obtained by averaging voice data obtained by causing a test subject to repeatedly vocalize a voice module including a plosive, the averaging being performed with a first window length set to be equal to or less than a standard vocalizing time of the plosive;

generating a second line obtained by averaging the voice data with a second window length set to be equal to or more than a standard time of the voice module and equal to or less than twice the standard time;

detecting a section in which a value of the first line is larger than a value obtained by multiplying a value of the second line by a predetermined positive real number; and determining an articulation disorder based on a result of the detecting of the section.

* * * * *